United States Patent
Way et al.

(10) Patent No.: US 10,237,404 B1
(45) Date of Patent: Mar. 19, 2019

(54) PERSONALIZED DEVICES FOR OUT-BOUND AND IN-BOUND INMATE CALLING AND COMMUNICATION

(71) Applicant: CONFINEMENT TELEPHONY TECHNOLOGY, LLC, Greensboro, NC (US)

(72) Inventors: Zachary Alan Way, McLeansville, NC (US); Timothy Edwin Pabon, Greensboro, SC (US); Todd Russell Thomasson, Elon, NC (US); Rick Allen Lubbehusen, Winston Salem, NC (US)

(73) Assignee: CONFINEMENT TELEPHONY TECHNOLOGY, LLC, Greensboro, NC (US)

( * ) Notice: Subject to any disclaimer, the term of this patent is extended or adjusted under 35 U.S.C. 154(b) by 0 days.

(21) Appl. No.: 15/791,698

(22) Filed: Oct. 24, 2017

Related U.S. Application Data

(63) Continuation of application No. 15/623,804, filed on Jun. 15, 2017, now Pat. No. 9,832,313.
(Continued)

(51) Int. Cl.
*H04M 1/56* (2006.01)
*H04M 15/06* (2006.01)
(Continued)

(52) U.S. Cl.
CPC ............. *H04M 3/436* (2013.01); *H04M 3/38* (2013.01); *H04M 3/42059* (2013.01);
(Continued)

(58) Field of Classification Search
CPC ............. H04L 65/1069; H04L 65/1076; H04L 65/1096; H04L 65/403; H04M 1/72577; H04M 3/4365; H04M 15/08; H04W 12/06; H04W 4/24; G06F 1/305
USPC ......... 379/91.01, 91.02, 93.01, 93.02, 93.03, 379/93.09, 93.17, 93.23, 142.05, 142.06, 379/142.17, 207.11, 207.12, 207.13, 379/207.15, 210.02, 211.02, 112.01, 379/142.07, 184, 188, 194, 201.07, 379/201.08
See application file for complete search history.

(56) References Cited

U.S. PATENT DOCUMENTS

| | | | |
|---|---|---|---|
| 5,655,013 | A | 8/1997 | Gainsboro |
| 6,560,323 | B2 | 5/2003 | Gainsboro |

(Continued)

*Primary Examiner* — Binh Kien Tieu
(74) *Attorney, Agent, or Firm* — Thompson Hine LLP

(57) ABSTRACT

Systems and techniques are disclosed for establishing inbound calls and outbound calls involving inmates and outside parties. One exemplary technique receives input identifying authorized sources who are authorized to initiate and conduct calls with an inmate and stores a list of the authorized sources. The list, for example, can include telephone numbers, VOIP caller identifiers, and/or call privileges associated with the sources. The technique receives an inbound call directed to the inmate and determines whether the source of the inbound call is authorized or not, for example, by comparing information about the source with information in the list of authorized sources and/or based on the call privileges. If the source is authorized, the call is permitted. If not the technique routes the call to a payment interface for the caller to provide payment information.

17 Claims, 6 Drawing Sheets

```
TABLET SIGNOUT
Inmate       Device      Time Remaining
John Doe     123         1 hour 15 min
Jack Doe     456         15 min
Jerry Doe    789         Please return TABLET WAIT LIST
Inmate       Time Available
Joe Doe      2 hours INCOMING CALLS
Inmate       Time to Answer   Message
Jed Doe      45 seconds
Jared Doe    Missed (1:45pm)  Yes
```

Related U.S. Application Data

(60) Provisional application No. 62/415,931, filed on Nov. 1, 2016.

(51) Int. Cl.
*H04M 13/00* (2006.01)
*H04M 3/42* (2006.01)
*H04M 3/436* (2006.01)
*H04M 15/00* (2006.01)
*H04M 3/38* (2006.01)
*H04M 17/00* (2006.01)
*H04M 15/10* (2006.01)

(52) U.S. Cl.
CPC ........... *H04M 15/10* (2013.01); *H04M 15/39* (2013.01); *H04M 15/887* (2013.01); *H04M 17/10* (2013.01); *H04M 2203/6018* (2013.01); *H04M 2203/6081* (2013.01)

(56) References Cited

U.S. PATENT DOCUMENTS

| | | | |
|---|---|---|---|
| 6,668,045 B1 | 12/2003 | Mow | |
| 7,106,843 B1 | 9/2006 | Gainsboro | |
| 7,333,798 B2 | 2/2008 | Hodge | |
| 7,783,021 B2 | 8/2010 | Hodge | |
| 7,853,243 B2 | 12/2010 | Hodge | |
| 8,509,736 B2 | 8/2013 | Hodge | |
| 8,929,524 B2 | 1/2015 | Hodge | |
| 9,014,355 B2 | 4/2015 | Heaton | |
| 9,030,292 B2 | 5/2015 | Torgersrud | |
| 9,225,701 B2 | 12/2015 | Gongaware | |
| 9,307,386 B2 | 4/2016 | Hodge | |
| 9,742,910 B2 * | 8/2017 | Keiser | H04M 3/436 |
| 2003/0198325 A1 | 10/2003 | Bayne | |
| 2007/0041545 A1 | 2/2007 | Gainsboro | |
| 2011/0206038 A1 | 8/2011 | Hodge | |
| 2011/0317685 A1 * | 12/2011 | Torgersrud | H04L 12/66 370/352 |
| 2012/0099714 A1 | 4/2012 | Hodge | |
| 2013/0263227 A1 | 10/2013 | Gongaware | |
| 2013/0329867 A1 | 12/2013 | Hodge | |
| 2014/0270124 A1 * | 9/2014 | Gongaware | H04M 3/38 379/188 |
| 2014/0287715 A1 * | 9/2014 | Hodge | H04W 4/24 455/406 |
| 2015/0215254 A1 | 7/2015 | Bennett | |
| 2015/0256671 A1 * | 9/2015 | Torgersrud | H04L 12/66 379/88.22 |
| 2016/0078281 A1 * | 3/2016 | Gongaware | H04L 63/08 382/118 |
| 2016/0119580 A1 | 4/2016 | Torgersrud | |
| 2016/0191850 A1 * | 6/2016 | Humphries | H04N 7/15 348/14.02 |
| 2016/0381082 A1 * | 12/2016 | Hodge | H04L 51/066 726/5 |
| 2017/0180564 A1 * | 6/2017 | Heaton | H04M 15/47 |
| 2017/0195494 A1 * | 7/2017 | Bengston | H04M 7/0012 |
| 2017/0208468 A1 | 7/2017 | Hodge | |
| 2017/0353404 A1 * | 12/2017 | Hodge | G06F 17/30867 |

* cited by examiner

PERSONALIZED DEVICES FOR OUT-BOUND AND IN-BOUND INMATE CALLING AND COMMUNICATION

RELATED APPLICATIONS

This patent application is a continuation of U.S. patent application Ser. No. 15/623,804 filed on Jun. 15, 2017, which claims the benefit of U.S. Provisional Application No. 62/415,931 filed on Nov. 1, 2016, entitled "Personalized Devices For Out-Bound and In-Bound Inmate Calling and Communication," both of which are incorporated herein by this reference in their entireties.

FIELD OF THE INVENTION

This disclosure relates generally to devices and systems associated with inmate communications, information, and services.

BACKGROUND

Various communication systems are used to enable inmates of prisons and other institutions to talk with loved ones, friends, attorneys, and others who are outside of the institution. Unfortunately, inmates and these outside parties are not always able to connect due to availability, timing, and call restrictions. For example, an inmate may try to call home to the inmate's mom during calling hours set by the institution and happen to call when the mom has stepped out, has a visitor, or is otherwise not available. Similarly, an inmate may be unable to contact an attorney if the attorney is on another call, in court, or otherwise unavailable.

In addition, inmates are generally unable to receive calls from outside the institution. Conventional inmate phone systems have employed phones that are shared by multiple inmates and located in common areas. Since there was no way to identify which inmate an incoming call was for, since inmates are often not able to access the phones (e.g., while the inmate is in his or her cell, during meals, etc.), and since there would have been significant issues identifying who pays for incoming calls, such in-bound calls have generally been prohibited in confinement institutions. The inmate's family and contacts outside of the institution are thus often required to wait for a call from the inmate, which is burdensome and often results in calls occurring at inconvenient times and places and prevents the outside party from contacting the inmate for emergencies and urgent matters.

Recently, confinement institutions have attempted to use wall-mounted kiosks for video visitation. Unfortunately, these wall-mounted kiosks are used infrequently by inmates, with the result that call or other revenue associated with the kiosks is often insufficient to justify the costs of installing the kiosks and providing the services thereon. Moreover, these devices have generally not solved the issues preventing inmates and contacts outside the institution to connect with one another at convenient times or based on the outside party's need to contact the inmate. Similarly, existing tablet device systems that use tablets that are shared between multiple inmates also have not adequately addressed these issues.

SUMMARY

Systems and techniques are disclosed for establishing inbound calls and outbound calls involving inmates and outside parties. One exemplary technique receives input identifying authorized sources who are authorized to initiate and conduct calls with an inmate and stores a list of the authorized sources. The list, for example, can include telephone numbers, Voice Over Internet Protocol (VOIP) caller identifiers, Internet Protocol (IP) addresses, geographic locations, and/or call privileges associated with the sources. The technique receives an inbound call directed to the inmate and determines whether the source of the inbound call is authorized or not based on information in the inbound call data and data stored in the list about the authorized sources of calls. For example, this can involve comparing information about the inbound call source such as the telephone number, IP address, and/or geographic location with corresponding information in the list of authorized sources to identify whether there is a match or not. If the source of an inbound call is authorized, the call is permitted. If not, the technique does not permit the call and/or routes the call to a payment interface for the caller to provide payment information or other identifying information. The determination of whether to allow the call using the account or not can additionally or alternatively be based on the call privilege information and/or call restrictions imposed by the institution. These inbound call procedures are used to ensure that only appropriate parties are able to conduct inbound calls with inmates at appropriate times, prevent inmates from having contact with prohibited individuals, and prevent the unauthorized use of an account to pay for the calls. Additional embodiments of the invention facilitate the authorization of inbound calls by inmates and/or account holders, the blocking of unwanted callers, the notification of inmates regarding inbound calls and available devices, and numerous other features that are useful in the context of communications with inmates in confinement institutions.

DETAILED DESCRIPTION

Figure 1:
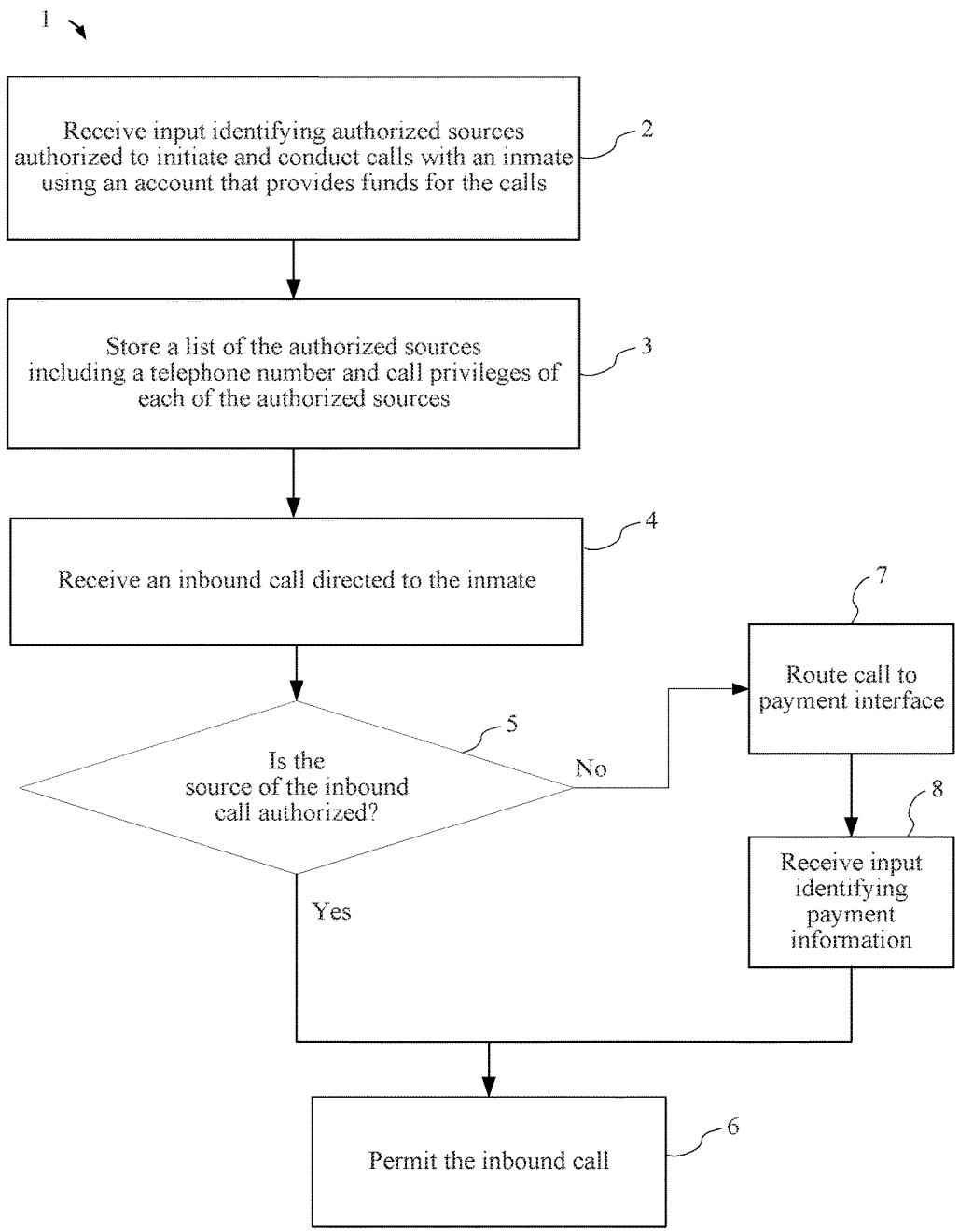
FIG. 1 is a flow chart illustrating an exemplary method for establishing inbound calls to an inmate from an outside party.

As described above, existing confinement institution phones, kiosks, and tablets do not adequately facilitate calls between inmates and parties outside the institution at convenient times or based on the outside party's need to contact the inmate. Embodiments of the invention provide inmates with personalized devices that allow the inmates to make and receive calls and communications, and to use other personalized services on the device.

Devices Personalized for Receiving Calls

In some embodiments of the invention, an inmate is provisioned with a communication device (e.g., a cellphone, smart phone, or calling-enabled tablet) that is personalized for the inmate to receive calls. In one embodiment, the device has a specific phone number that is used by outside parties to reach the device. In another embodiment, the outside party dials a general phone number and uses an automated menu to be routed to the appropriate inmate's personal device. In another embodiment, a call is connected using IP-based calling, for example, by the calling party selecting the name of the inmate to receive the call and the appropriate device being identified based on this name identity. In another embodiment, inmates share devices that they individually log into and calls are routed to an inmate on a particular device based on the inmate being logged into that particular device.

Techniques for Identifying Outside Call Sources for In-Bound Calls

Some embodiments of the invention facilitate inmate devices that allow in-bound (and out-bound) calls by providing techniques for identifying an account to provide payment for each call. Various identification techniques are used. In one example, an outside party customer sets up an account to pay for calls with one or more particular inmates and provides funds into the account. The outside party also provides a list of one or more outside call sources that are able to make calls to the inmate and receive calls from the inmate. Such outside call sources can include phone numbers, VOIP caller identifiers, device identifiers, identified IP addresses, IP-based calling account numbers, names, device geographic location, and other outside party, device, or location identification information. In one embodiment, the outside party customer that sets up and manages the customer account identifies call privileges that differ depending on the outside call source. For example, the privileges can specify that the inmate's mom's cell phone can be used to call the inmate or receive calls from the inmate, but that the inmate's sister's cell phone can only receive calls from the inmate. As another example, the privileges can identify specific hours that calls to and from the inmate can be made for some or all of the outside call sources associated with the account.

When an in-bound call is made to the inmate, the call is controlled by a communications system. The communication can be provided by the institution or a third party providing communication services for the institution based on parameters specified by the institution. In one embodiment, before the outside party is connected with the inmate, the system identifies where (e.g., device, address, and/or person) the call is coming from and determines if there is an account associated with the outside call source to pay for the call. If not, the call is not permitted or the outside party is routed through a menu or other interface to identify an existing account or create a new account to pay for the call. In one embodiment of the invention, a caller ID feature is used to determine a phone number of an outside call source used to place an in-bound call to the inmate. Based on that phone number matching an approved outside caller for the account, the system allows the outside caller to conduct the call with the inmate. In another example, the IP-based calling account is used to call the inmate and the identity of the IP-based calling account is matched with a source for the account before the call is allowed to proceed.

A pre-approved number (PAN) list can additionally or alternatively be used to identify an outside call source or otherwise identify who pays for a call. The facility could create a pre-approved number list or the list could be created automatically by the inmate identifying the outside parties with the communications system.

Additionally, or alternatively, login credential (e.g., ID, password, token-generated code, etc.) are used to identify and/or confirm the source of an incoming call. Such login credentials can also be used to identity a called party when the inmate makes an outgoing call to ensure that the inmate is calling a person, device, or location that is approved under the details of the customer account that will pay for the call.

FIG. 1 is a flow chart illustrating an exemplary method for establishing inbound calls to an inmate from an outside party. The exemplary method 1 can be implemented by an inmate device such as by apps 59a-c on one of inmate devices 57a-c (FIG. 5) and/or on a server such as server 53 (FIG. 5), although other devices and configurations can also be implemented. The exemplary method 1 can be implemented by storing and executing instructions in a non-transitory computer-readable medium. Reference to the method 1 being performed by a computing device includes the method 1 being performed by one or more computing devices.

The method 1 involves receiving input identifying authorized sources that are authorized to initiate and conduct calls with an inmate using an account that provides funds for the calls, as shown in block 2. For example, a user interface may receive input identifying the names, telephone numbers, VOIP caller identifiers, passwords, unique identifiers, geographic locations, and/or other information from a person setting up an account for an inmate. As a specific example, an inmate's mother may create an account by providing information about herself (e.g., name, phone number(s), password, address, payment information, calling privileges, and/or availability schedule, etc.). The mother may also provide information about other non-inmates that are permitted to receive calls from the inmate and/or place calls to the inmate using the account. For example, the mother may provide information about the inmate's sister (e.g., name, phone number(s), password, address, calling privileges, and/or availability schedule, etc.) and the inmate's girlfriend (e.g., similar information). In other embodiments of the invention, the input identifying the authorized sources alternatively or additionally is received from the inmate.

The method 1 further involves storing a list of authorized sources including a telephone number and call privileges of each of the authorized sources, as shown in block 3. Additional or alternative information about each source can be stored such that there are one or more items of information that can be used to identify that a source of an inbound call corresponds to one of the authorized sources. For example, the list may comprise information stored in a table or database that identifies the name of the inmate's sister, her phone number, and identify that she can receive calls at that number any time but can only place calls to the inmate on Sundays between noon and 5 pm. The call privileges can identify days and times at which calls can be placed to and received from the inmate, limit the duration of calls, limit total call time per day, week, month, etc., and/or limit the conditions under which calls are permitted (e.g., only when monitored by the account holder, etc.).

The method 1 further involves receiving an inbound call directed to the inmate, as shown in block 4. For example, an outside party can use a phone, calling app, or other device or software to place a call to a phone number or VOIP identity associated with the confinement institution and/or inmate. In one example, the outside party initiates a call directly to the inmate by placing the call to a phone number and/or unique identifier that is uniquely associated with the inmate, e.g., each inmate has his/her own. In another example, the outside party initiates a call to the confinement institution or to a third-party call service provider that facilitates access to multiple inmates at one or more institutions. The outside party provides additional input to identify the particular inmate to whom the call should be directed. As examples, the outside party may select the name of the inmate in a list of names or provide text or vocal input identifying the inmate's name or ID number. In another example, the receiving system recognizes the outside caller based on caller ID or other caller identification information and identifies automatically which inmate is associated with that outside caller source.

The method 1 next determines if the source of the inbound call is authorized, as shown in block 5. For example, this can involve comparing a phone number of the inbound call with the telephone numbers in the list of authorized sources to identify whether the calling number matches any of the authorized source telephone numbers. In another example, this involves additionally or alternatively comparing unique information about the source of the call with information about the authorized sources in the list to identify whether the source of the call is an authorized source or not.

If the source of the inbound call is authorized, the method 1 permits the call, as shown in block 6. If the source of the inbound call is not authorized, the method 1 routes the call to a payment interface, as shown in block 7, and receives input identifying payment information, as shown in block 8, before proceeding to permit the inbound call in block 6.

Techniques for Controlling Unwanted in-Bound Calls

A calling account set up by an outside customer may allow an inmate to receive calls from unspecified parties. For example, this allows the inmate to receive and pay for calls from an attorney, counselor, or other party for which the outside customer does not have source identification. Various techniques can be used to ensure that the calling account is not used to pay for solicitors and others who intentionally or unintentionally attempt to make unwanted inbound calls to the inmate. In one embodiment of the invention, the inmate's device provides caller identification information so that the inmate can view information about the source of an inbound call and choose not to answer the call based on that information. In another embodiment, a first portion (e.g., 15 seconds of calls) are not charged to allow the inmate time to end a call from an unwanted outside party without paying for the call. In another embodiment, the inmate can select an option that pauses the call and informs the outside party that they must provide payment for the call (separate from the customer account used to pay for normal calls to and from the inmate).

Figure 2:
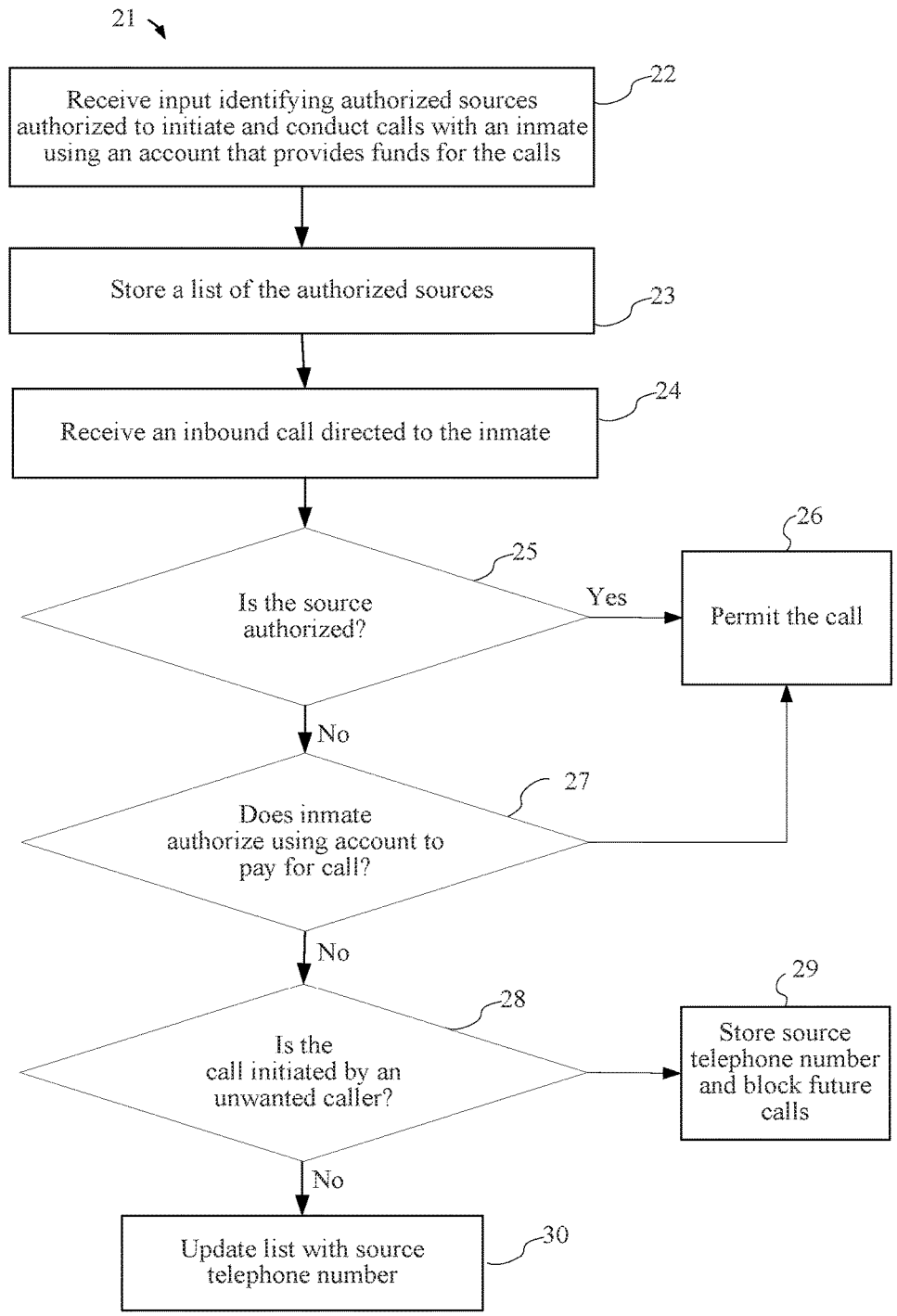
FIG. 2 is a flow chart illustrating an exemplary method for controlling inbound calls to an inmate from an outside party.

FIG. 2 is a flow chart illustrating an exemplary method for controlling inbound calls to an inmate from an outside party. The exemplary method 1 can be implemented by an inmate device such as by apps 59*a-c* on one of inmate devices 57*a-c* (FIG. 5) and/or on a server such as server 53 (FIG. 5), although other devices and configurations can also be implemented. The exemplary method 21 can be implemented by storing and executing instructions in a non-transitory computer-readable medium. Reference to the method 21 being performed by a computing device includes the method 21 being performed by one or more computing devices.

The method 21 involves receiving input identifying authorized sources that are authorized to initiate and conduct calls with an inmate using an account that provides funds for the calls, as shown in block 22. As described with respect to block 2 of FIG. 1, such input can be received from the account holder and/or the inmate. The method 21 further involves storing a list of authorized sources, as shown in block 23. Such a list can be similar to the list discussed with respect to block 3 of FIG. 1. The method 21 further involves receiving an inbound call directed to the inmate, as shown in block 24, which can be similar to receiving an inbound call as discussed with respect to block 4 of FIG. 1.

The method 21 next determines if the source of the inbound call is authorized, as shown in block 5. This generally involves comparing information about the inbound call (e.g., calling number, called number, caller ID, caller name, etc.) with information about the authorized sources in the list and determining whether there is a match.

If the source is authorized, the method 21 permits the call, as shown in block 26. If the source of the inbound call is not authorized, the method 1 determines whether the inmate authorizes use of the account to pay for the call, as shown in block 27. For example, the inmate may receive a call from the system that asks for authorization to complete the inbound call using the inmate's account. If the inmate does authorize using the account for the call, the method 21 permits the call, as shown in block 26. If not, the call can still be completed based on the outside party providing payment information or the inmate conditionally authorizing the call (e.g., the call is permitted initially and authorized if the inmate does not hang up within a predetermined amount of time, etc.). In an alternative embodiment of the invention, the determination of inmate authorization is avoided based on the outside party source providing separate payment information so that the inmate's account need not be used for the call.

In block 28, the method 21 determines whether the call was initiated by an unwanted caller. For example, if the inmate hangs up a conditional call within the predetermined time (e.g., within 15 seconds, within 20 seconds, etc.), the call is determined to have been from an unwanted caller. Based on the call lasting less than the predetermined time, the inmate is prompted to provide input identifying whether the call is from an unwanted caller who should be blocked. If the call is from an unwanted caller, the inmate's account is not charged for the call and the source telephone number is stored and used to block future calls from that unwanted caller, as shown in block 28. If the call is determined to not have been from an unwanted caller, then the method 21 updates the list with the source telephone number as shown in block 30. For example, if the inmate conducts a conditional call for more than a predetermined threshold amount of time (e.g., 15 seconds, 20 seconds, etc.), then the caller is not considered an unwanted caller and information about the source of the call is used to update the list. In one example, the source of the inbound call is added as an authorized source. In another example, during or after the call, the inmate is queried for an instruction regarding adding the source of the inbound call as an authorized source or not and the list is updated accordingly.

Techniques for Providing Inbound Calls Using Shared Devices

Figure 3:
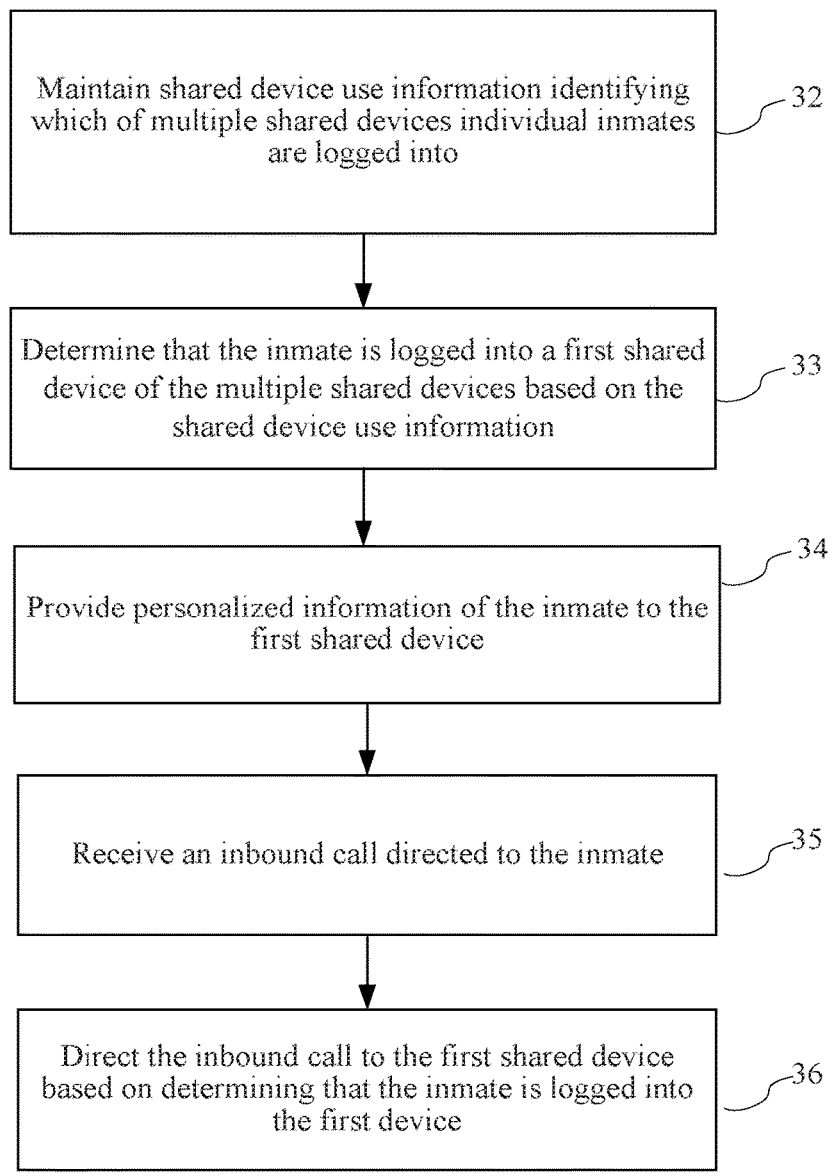
FIG. 3 is a flow chart illustrating an exemplary method for establishing calls between an inmate and an outside party.

FIG. 3 is a flow chart illustrating an exemplary method for establishing calls between an inmate and an outside party. The exemplary method 31 can be implemented by a server such as server 53 (FIG. 5) located at a confinement institution or elsewhere, although other devices and configurations can also be used to implement the method 31. The exemplary method 31 can be implemented by storing and executing instructions in a non-transitory computer-readable medium. Reference to the method 31 being performed by a computing device includes the method 31 being performed by one or more computing devices.

Method 31 involves maintaining shared device use information identifying which of multiple shared devices individual inmates are logged into, as shown in block 32. For example, such a list can be maintained in a table or database and include records that identify for each device, which user is logged in, when the user logged in, the inmate's permissions, the inmate's use data, and/or the inmate's content account that includes personalized content. As users log in and log out of different devices, the shared device use information is updated, preferably in real time. For example, the application that receives login credentials on a device may send an update message to the database and/or table when an inmate logs into the device. Similarly, a log out message is sent when the inmate logs out, powers off, or otherwise discontinues use of the device. In one embodiment of the invention, the devices are configured to automatically log inmates out based on inactivity on the devices exceeding a threshold amount of time and/or based on detecting that the inmate associated with the login is no longer using and/or within the proximity of the device. The shared device use information is updated whenever there is a logout occurrence.

Method 31 further determines that the inmate is logged into a first shared device of the multiple shared devices based on the shared device use information, as shown in block 33. Such a determination can occur, for example, when an inmate first logs onto a device and/or when the inmate opens a particular app or accesses a particular feature provided on the device. In response, the method 31 provides personalized information of the inmate to the first shared device. For example, this can involve providing the inmate's personal e-mail, text messages, phone messages, images, sound files, videos, call account information, commissary account information, counselor information, attorney information, calendar information, and/or any other inmate specific information.

In block 35, the method 31 receives an inbound call directed to the inmate. Such an inbound call can be received in various ways, was as discussed with respect to FIG. 1. The method 31 directs the inbound call to the first shared device based on determining that the inmate is logged into the first shared device, as shown in block 36. In this way, the inmates are able to access personalized information and receive calls on any of those shared devices in the institution.

If an inmate is not using any of the shared devices when an inbound call is received for the inmate, an audible and/or visual notification can be provided to notify the inmate to login to a shared device to answer the inbound call.

Figure 4:
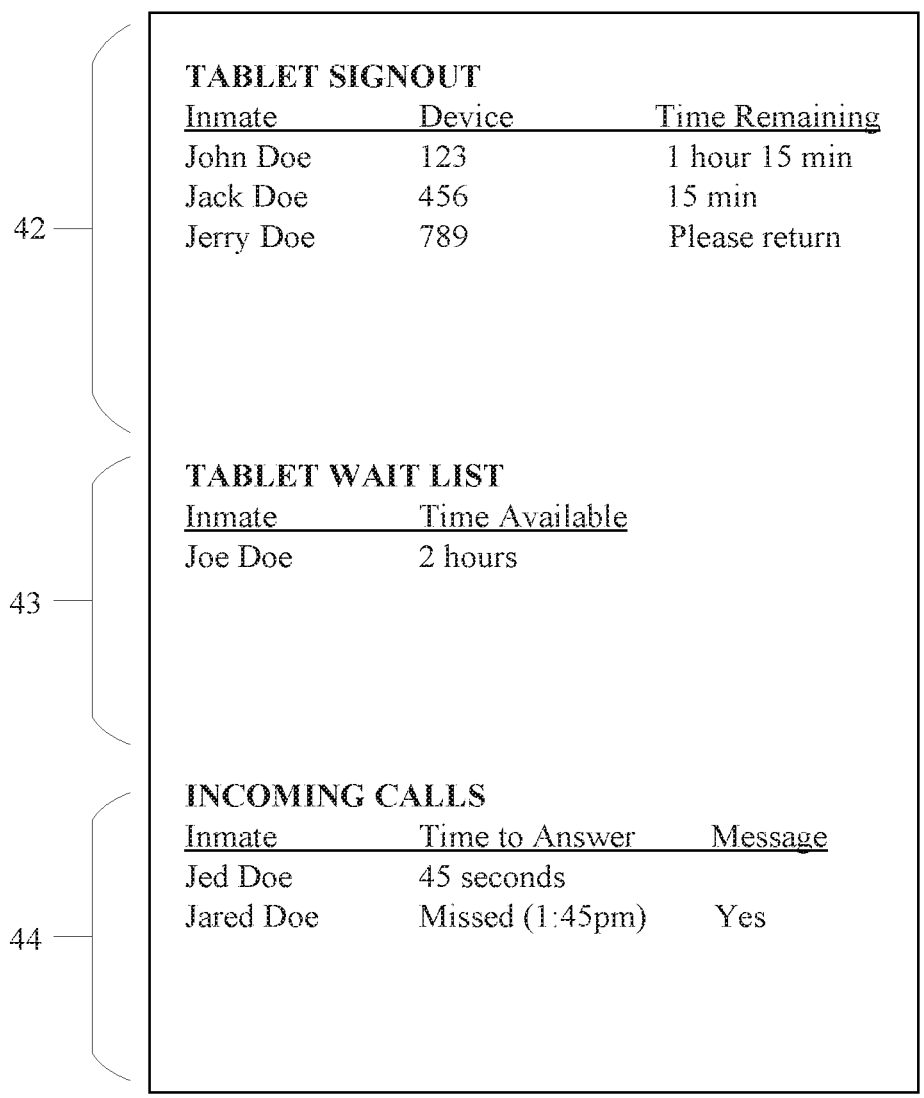
FIG. 4 is a block diagram depicting a user interface of a display provided within a confinement institution to provide coordinated tablets shared by inmates for accessing personalized information and participating in telephone calls.

FIG. 4 is a block diagram depicting a user interface of a display provided within a confinement institution to provide information about tablets shared by inmates for accessing personalized information and participating in telephone calls. The exemplary user interface 41 can be implemented by a server such as server 53 (FIG. 5) located at a confinement institution or elsewhere, although other devices and configurations can also be used to implement the user interface 41. The exemplary user interface 41 can be implemented by storing and executing instructions in a non-transitory computer-readable medium. Reference to the user interface 41 being provided by a computing device includes the user interface 41 being provided by one or more computing devices.

The user interface 41 include a tablet signout section 42, a tablet waitlist section 43, and an incoming calls section 44. In alternative embodiments, the user interface includes only one or more of these features and/or includes additional features. The sections 42-44 are provided to illustrate a few of the features and functions that could be provided on a user interface that is displayed on one or more large screens, such as televisions or monitors that are provided in one or more common areas of an institution. Such devices may additionally be connected to speakers that provide sound notifications when incoming calls are received, devices become available, and/or based on other changes to the information that is displayed.

The tablet signout section 42 identifies each of the devices that are currently signed out (e.g., devices 123, 456, and 789). For each device, the tablet signout section identifies which inmate currently has signed out the device (e.g., John Doe has signed out device 123, Jack Doe has signed out device 456, and Jerry Doe has signed out device 789). Signout of devices can be determined based on which inmate is currently logged into each device. Alternatively, signout can be separate from a device. For example, each inmate may provide identification when physically receiving the device (e.g., from a cart of devices) and then separately logs into the device using login credentials. The tablet signout section 42 also identifies each inmate's time remaining on the particular device, during a particular use session, and/or with respect to using any device during a time period. In this example, John Doe has 1 hour and 15 minutes remaining, Jack Doe has 15 minutes remaining, and Jerry Doe's time has expired. Since the available time for Jerry Doe to use a tablet has expired the tablet signout section 42 provides a message to "Please return" the device.

The tablet wait list section 43 of the user interface 41 identifies inmates who are waiting to use a device. In this example, there are only three devices, which are all in use, so there is a waitlist to use those devices. To ensure that inmates are given equal or otherwise fair amounts of time on a limited amount of devices, each inmate can be allocated an amount of time (e.g., 5 hours per week, etc.). In this example, Joe Doe is on the wait list and has two hours of time available to use one of the shared devices in the current week. When a device is returned and available, the tablet wait list section 43 is updated to display a notification that a device is available for the next inmate on the tablet wait list.

The incoming calls section 44 of the user interface 41 provides notification of incoming calls. In this example, an inbound call is currently being received for inmate Jed Doe, who has 45 seconds remaining to login to a device and answer the call. Once the time expires the incoming calls section 44 is updated to reflect that the call was missed and the time the call was received. In this example, Jared Doe missed a call at 1:45 and the caller left a message, as shown in the incoming calls section 44 of the user interface 41.

Techniques for Managing in-Bound Messages

Some embodiments of the invention facilitate inmate devices that allow in-bound and out-bound calls by providing techniques for identifying an account to provide payment for messages left for the inmate if, for example, the inmate does not answer the call or is not currently logged into the device. Various identification techniques are used. In one example, an account is established to pay for the call that identifies call sources and further identifies whether such sources are permitted to leave voice messages for the inmate. For example, the inmate's mom may be permitted to leave unlimited voice messages, the inmate's sister may be permitted to leave up to 10 minutes of messages per week, and the inmate's girlfriend may be prohibited from leaving messages altogether. The account can be charged for the leaving of a message at a same or different rate that the account is charged for calls.

Messages are accessible based on personalization of the inmate's device in some embodiments of the invention. For example, the inmate's device can display notifications, icons, or other indicators indicating the existence of new messages and receive input providing access to new messages when the user interacts with the icons.

One embodiment of the invention receives input from an outside party leaving a "call me back" message, that alerts the inmate to call the outside party back as soon as the inmate accesses the personalized device or otherwise become available. Alerts could be transmitted to multiple devices including, but not limited to, phone sets, tablets and one or more centralized screens in the resident living unit.

Techniques for Communicating and Sharing Information Using Personalized Devices

The personalized services provided on inmate devices can include features that allow the inmate and outside parties to exchange documents and other information using an account, which may, but need not be, the same account that is used to pay for inmate calls. The account can be used to identify outside sources (devices, locations, parties, etc.) that can send and receive information in communications with the inmate. In one embodiment of the invention, the system and/or particular customer accounts are configured to charge for information transfers, for example, charging based on data volume, per transferred item, or based on a fixed monthly fee for unlimited data transfer, as examples. In other embodiments of the invention, information charges are provided for free, or provided for free up to a data limit after which charges are applied. The system additionally or alternatively sets limits based on network, institution, or customer settings.

Information that is provided to and from the inmate can be maintained in a storage location that is accessible by the inmate and/or outside parties for subsequent retrieval and use. In one embodiment of the invention, an outside party is able to send a document to the inmate that is stored on the inmate's personalized device. The document can additionally or alternatively be stored on a server and associated with the inmate. Both the inmate and outside party can be enabled to access and/or edit the document. Documents and other information that is uploaded and/or edited by the inmate and outside parties can be monitored both at the time of upload and at times when changes are made to the documents and information. The changes can be tracked so that the system maintains copies of prior versions of documents before changes, documents that are deleted, etc.

Personalized information for an inmate can also be provided by the institution, law enforcement, and/or any other party and presented to the inmate using an interface on the inmate's personalized device. This information can further be made available to parties outside the institution, such as the inmate's family and other parties associated with a customer account used to communicate with the inmate. Providing personalized information to inmates and outside parties that use a customer account for communication with the inmate, addresses several issues that have traditionally troubled those involved. For example, inmates and their families often struggle to keep track of charges that are being made against the inmate, upcoming court dates, bond information, proposed release dates, available attorneys in the area, the rules, regulations, and handbooks of the facility, and other such information. Embodiments of the invention make this personalized information available to the inmates and other interested parties in a convenient easy to access manner by providing the information on personalized devices for the inmates and via accounts that outside parties use to communicate with the inmate on the personalized devices. Information for the inmate can be preloaded on the device prior to providing the device to the inmate and then supplemented and updated based on changed circumstances and otherwise with new information.

The inbound calling techniques used by outside parties to call inmates can be part of a more general inbound access technique where the outside party access the inmate's personalized information. Providing both features using a common interface simplifies the process for those involved and for the providers of the services involved. Moreover, information can be presented to an outside party when the outside party makes an inbound call to the inmate. Before (or after) the outside party is able to talk with the inmate, the system can present announcements from the institution as well as personalized information about the inmate based on the personalized information of the inmate. For example, the system may provide an automated message that states "The hearing for [inmate name] has been rescheduled from August 8 to August 15 at 9:00 am]."

Certain embodiments of the invention provide interfaces for the inmate, outside party, institution, law enforcement, courts, attorneys, counselors, educators, and other parties to share calendar items with one another so that the respective parties can identify appropriate and convenient times for a call and otherwise coordinate activities.

In some embodiments of the invention, the inmate's personalized device provides an interface for the inmate to access web services, such as bill pay services. The inmate can pay a bill using a merchant website and download the payment receipt into a personalized file storage area on the inmate's device or network location specifically used for the inmate's personalized information.

Additional Features, Institution Controls, and Monitoring Capabilities

Certain embodiments of the invention send IP-based communications (e.g., VOIP messages) to enable inmate calls. An outside party with a suitable electronic device having Wi-Fi capability and an Internet connection loads a calling app onto the device. The inmates have their own version of the same or similar app. The outside party's app and the inmate's app communicate with one another (directly or through a server) via a network such as the Internet for calls and to share information. The apps can provide various features specific to providing services to inmates and outside parties including, but not limited to, online/offline availability statuses, missed call notifications, billing notifications (e.g., low balance, no balance), features for making payments and setting up auto-payments to pay for calls and other services, options to store payment methods, and features to authorize adding funds mid-call.

Certain embodiments of the invention keep both the inmate and an outside customer who creates and manages an account to pay for inmate communications and services informed regarding the status of the account. For example, the inmate and/or outside party are informed, e.g., via notification popups, text messages, e-mail messages, and/or voice messages when money is added to the account. If the inmate was previously unable to make calls due to a low or zero balance, the inmate and outside customer are informed that funds are available and that calls are permitted. Similarly, if an inmate attempts to make an outbound call and sufficient funds are not available, the system can notify the outside customer of the inmate's attempt and the lack of funds.

In addition, the system can limit the inmates' calling capabilities and provide other controls to ensure that the calling platform is not used for forbidden purposes and otherwise abused. For example, restrictions are enforced so that the inmates cannot call victims or other blocked parties, to monitor calls, to verify inmate and outside party identities, and to provide other control functions. In one embodiment of the invention, an app on a device of an outside party accesses the device's GPS to ensure that the outside party is at an allowed location and only enables calls with the inmate while the outside party is at the allowed location.

Some embodiments of the invention provide a user interface that allows the institution staff to control use of personalized devices that are provided to inmates. The institution staff, for example, may specify particular time periods (e.g., days, hours, etc.) that some or all inmates can send and/or receive calls and/or information via their personalized devices. Similarly, the institution staff, investigators, and law enforcement can use the interface to monitor, record, and analyze ongoing calls and information transfers. The monitoring can include voice recognition, spoken word or phrase recognition, spoken name recognition, text recognition, image recognition, inmate PIN, token and any other appropriate technique that an institution or investigator or law enforcement may usefully employ.

Techniques for Continuing Service after Inmate Release

The personalized devices provided to inmates and/or the personalized information that is provided by such devices and stored thereon or on a network server are made available to the inmate after the inmate's release in some embodiments of the invention. For example, a personalized device purchased by an inmate can be taken with the inmate after he or she is released and used to access the information. Access to the information and personalized services can be provided based on a monthly and/or transactional fee, as examples. In one example, a SIM card is provided to the inmate that allows the inmate to use the personalized information on another device after the inmate is released. The former inmate and/or outside party may wish to continue to use the services to share calendars, contacts, tasks, and other information, to conduct virtual visitation sessions (e.g., to continue counseling sessions with a counselor), and to make calls with one another and other parties. For example, the inmate may use the device and/or services to call and e-mail a parole officer who can use the app to verify the inmate's location, schedule calls, and use other functions to share information with the inmate.

Techniques for Using a Multi-Inmate Device as a Personalized Device

Some embodiments of the invention provide a device that many inmates are able to use. When a given inmate uses the device, the inmate logs in with login credentials (e.g., ID, password, token, etc.) and, based on the login, the device is personalized to the inmate during the time that the inmate is logged in. The inmate's personalized information is stored on network server and accessible by the inmate while logged in. The inmate can use the device to make calls and receive calls while logged into the device. To receive inbound calls, the communication system receives the in-bound call requests, identifies which device the inmate is logged into (if any), and routes the call to the device or sends the call to a messaging service if the inmate is not using a device or does not answer. When the inmate is not using a device, one embodiment of the invention provides notification of incoming calls and/or messages to the inmate on a "stand-by" board. Such a standby board can identify inmates that are currently being called, inmates who received calls that were not answered, and/or inmates that have messages waiting. The inmates are then able to login to a device to answer incoming calls, obtain personalized information about missed calls, and access messages.

Exemplary System

Figure 5:
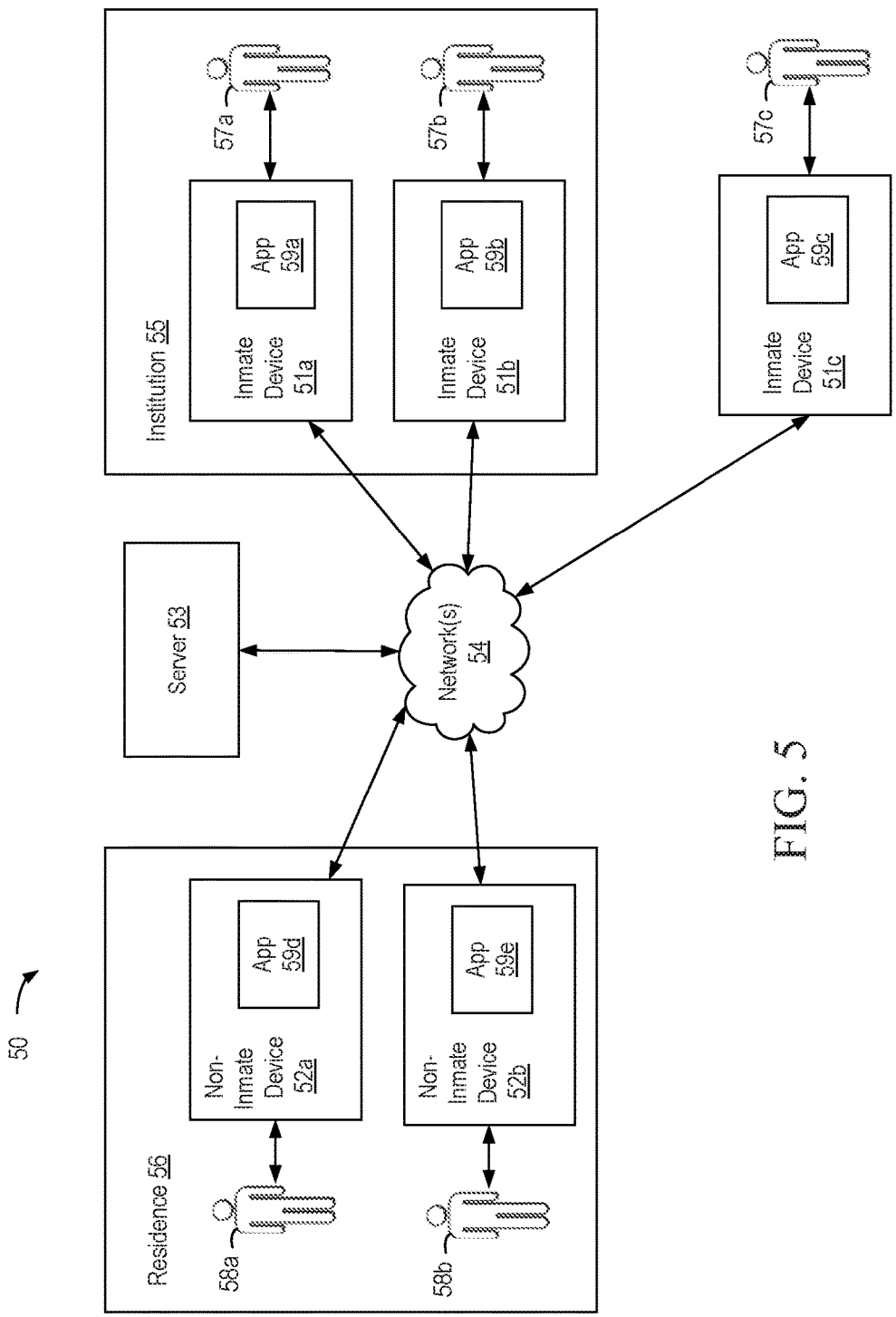
FIG. 5 is a diagram of an environment in which one or more embodiments of the invention can be practiced.

FIG. 5 is a diagram of an environment in which one or more embodiments of the present disclosure can be practiced. The system configuration of FIG. 5 is provided as one example of a system configuration. In a particular implementation, devices and the communications between them as well as the allocation of functionality amongst the multiple devices involved can be configured differently depending upon the particular circumstances of the implementation.

In FIG. 5, inmate devices 51a-c are used by inmates 57a-c, respectively. In this example, inmates 57a-b are within the institution 55, while inmate 57c is outside of the institution 55. Non-inmate devices 52a-b are used by non-inmates 58a-b within residence 56. In alternative examples, non-inmates will reside in different locations from one another. Each of the devices 51a-c, 52a-b includes a calling app 59a-e used by the user to place calls, receive calls, send messages, receive messages, and for other purposes related to communications with and information about the inmates, non-inmates, and the institution. For example, a non-inmate can initiate a call to an inmate using the app 59d on non-inmate device 52a via network 54 to app 59a on inmate device 51a. In this example, such a call identifies the inmate 57a. In response to receiving the call, the app 59a can display a notification/message telling the inmate 57a to answer the call from the non-inmate 58a. In one example, the app 59a provides caller identification information to the inmate 57a. The apps 59a-e can communicate with on another directly or via server 53 depending upon the particular implementation. The apps 59a-e can monitor the app-to-app calls, messages, and use of the devices to ensure that inmates are not able to use the devices and/or communications for prohibited purposes.

Figure 6:
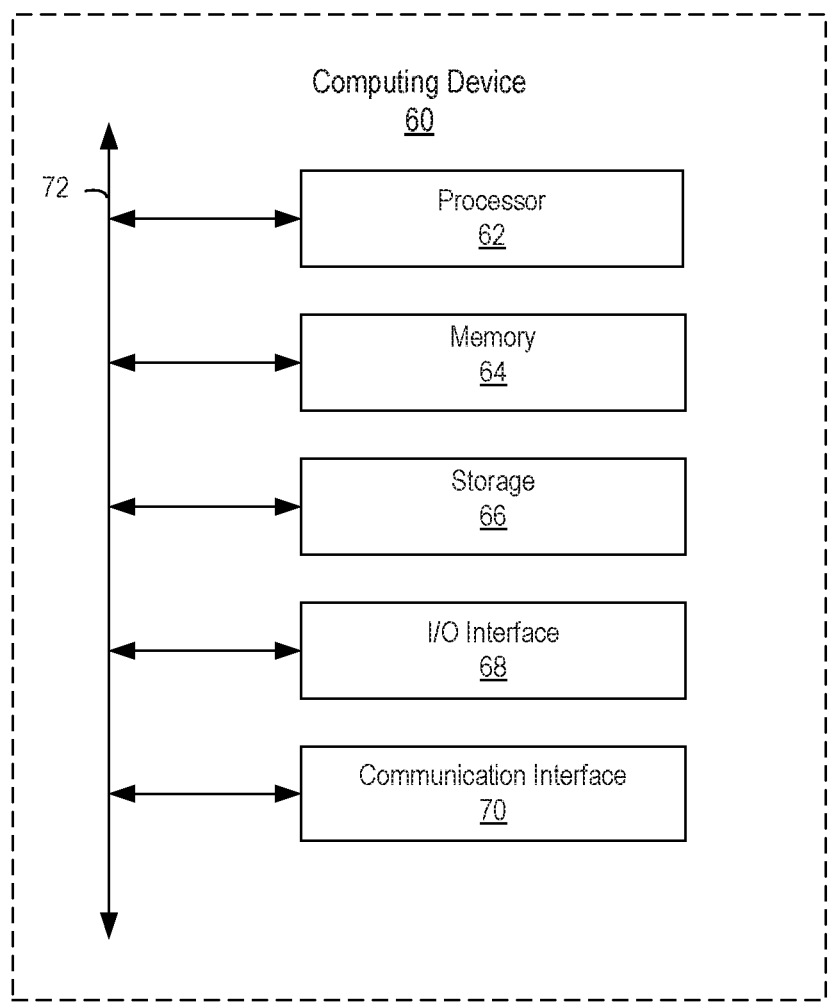
FIG. 6 is a block diagram depicting an example hardware implementation.

FIG. 6 is a block diagram depicting example hardware implementations for the servers and devices described in FIG. 5. Each such server or device 60 may include a processor 62 that is communicatively coupled to memory 64 and storage 66 and that executes computer-executable program code and/or access information stored in the memory 64 and storage 66. The processor 802 may comprise a microprocessor, an application-specific integrated circuit ("ASIC"), a state machine, or other processing device. The processor 62 can include any of a number of processing devices, including one. Such a processor 62 can include or may be in communication with a computer-readable medium storing instructions that, when executed by the process, cause the processor to perform the operations described herein.

The memory 64 and storage 66 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 60 may also comprise a number of external or internal devices such as input or output devices. For example, the device 60 may have input/output ("I/O") interface 808 that can receive input from input devices or provide output to output devices. A bus 72 can also be included in the device 60. The bus 72 can communicatively couple one or more components of the server. The server can execute program code that configures the processor to perform one or more of the operations described above with respect to the Figures. The program code may be included in the memory or any suitable computer-readable medium and may be executed by the processor or any other suitable processor. In additional or alternative embodiments, program code can be resident in a memory that is accessible via a data network, such as a memory accessible to a cloud service.

The device 60 can also include at least one network interface device or other communication interface 70. The communication interface 70 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative embodiments but according to the full breadth permitted by patent laws. It is to be understood that the embodiments shown and described herein are only illustrative of the principles of the present invention and that various modification may be implemented by those skilled in the art without departing from the scope and spirit of the invention.

What is claimed is:

1. A method, performed by a computing device, for establishing calls between an inmate and an outside party, the method comprising:
   maintaining shared device use information identifying which of multiple shared devices individual inmates are logged into, wherein each of the multiple shared devices are configured to log in individual inmates based on login credentials to provide personalized services;
   determining that the inmate is logged into a first shared device of the multiple shared devices based on the shared device use information, wherein determining that the inmate is logged into the first shared device occurs when the inmate opens a particular app or accesses a particular feature provided by the first shared device;
   providing personalized information of the inmate to the first shared device based on determining that the inmate is logged into the first shared device;
   receiving an inbound call directed to the inmate; and
   directing the inbound call to the first shared device based on determining that the inmate is logged into the first device.

2. The method of claim 1 further comprising:
   determining that the inbound call was not answered at the first shared device; and
   routing the call to a messaging device to receive a message for the inmate.

3. The method of claim 2 further comprising displaying a notification of the message on a messaging board.

4. The method of claim 3, wherein the messaging board identifies which of the inmates have new messages from inbound calls.

5. The method of claim 3, wherein the messaging board identifies called inmates who are currently receiving inbound calls that can be answered by each called inmate logging into one of the multiple devices.

6. A method, performed by a computing device, for establishing calls between an inmate and an outside party, the method comprising:

maintaining shared device use information identifying which of multiple shared devices individual inmates are logged into, wherein each of the multiple shared devices are configured to log in individual inmates based on login credentials to provide personalized services;

receiving an inbound call directed to the inmate;

providing a notification that the inbound call is being received for the inmate and indicating that the inmate must login to one of the multiple shared devices to answer the inbound call, wherein the notification indicates that the inmate has a threshold amount of time to login to one of the multiple shared devices and answer the inbound call.

7. The method of claim 6 further comprising:

determining that the threshold amount of time has expired; and based on the threshold amount of time having expired, updating the notification to indicate that the call was missed.

8. The method of claim 6 further comprising:

determining that the threshold amount of time has expired; and based on the threshold amount of time having expired, updating the notification to indicate that the call was missed and a time the call was received.

9. The method of claim 6 further comprising:

determining that the inmate has logged into a first shared device of the multiple shared devices based on the shared device use information; and directing the inbound call to the first shared device based on determining that the inmate is logged into the first device.

10. The method of claim 6 further comprising updating the notification to indicate that the call was missed and that the caller left a message.

11. The method of claim 6, wherein the notification is displayed on a television or monitor provided in a common area of an institution.

12. The method of claim 11 further comprising providing a sound indicating that the inbound call is being received.

13. The method claim 11 further comprising providing a sound indicating that a device has become available.

14. The method claim 11 further comprising providing a sound indicating that information displayed on the television or monitor provided in the common area has been changed.

15. The method of claim 11, wherein the television or monitor comprises:

a tablet sign-out section identifying which of the multiple shared devices are signed out, which inmate has currently signed out each of the multiple shared devices, and each inmates time remaining on each of the multiple shared devices.

16. The method of claim 15, wherein the tablet sign-out section identifies inmates whose time to use a checked-out device has expired.

17. The method of claim 11, wherein the television or monitor comprises:

a tablet wait list section identifying inmates who are waiting to use one of the multiple shared devices.

* * * * *